Patented Dec. 3, 1940

2,223,393

UNITED STATES PATENT OFFICE 2,223,393

METHOD FOR REDUCING UNSATURATED GERMINAL GLAND HORMONES

Lothar Strassberger, Berlin-Wilmersdorf, Germany, and Erwin Schwenk, Montclair, N. J., assignors to Schering Corporation, Bloomfield, N. J., a corporation of New Jersey No Drawing. Application October 1, 1936, Serial No. 103,568. In Germany October 2, 1935

8 Claims. (Cl. 260—397)

This invention relates to reduction products of germinal gland hormones and more particularly to reduction products of saturated and unsaturated germinal gland hormones containing at least one keto group, and of their isomers and derivatives and to a method of producing the same.

It is known that saturated and unsaturated germinal gland hormones containing at least one keto group, their isomers and derivatives of the same can be converted into physiologically very valuable compounds by subjecting the same to the action of reducing agents capable of transforming a keto group into a secondary alcohol group.

Thus, for instance, from the keto group containing follicle hormone of the formula $C_{18}H_{22}O_2$ by the reduction of the keto group to the secondary alcohol group the dihydro follicle hormone of the formula $C_{18}H_{24}O_2$ can be obtained which shows a physiological activity several times as high as that of the starting material. Likewise an increase in activity can be achieved in the case of other hormone substances containing a keto group, for instance, by transforming the androsterone of the formula $C_{19}H_{30}O_2$ into androstandiole of the formula $C_{19}H_{32}O_2$.

Furthermore, by reduction of the keto group of such hormone substances, their isomers or derivatives to the secondary alcohol group, compounds can be produced that are especially valuable on account of being usable as starting materials for the production of other, highly active substances; that applies, for instance, to the androstendioles of the formula $C_{19}H_{30}O_2$ which can be produced from dehydro androsterone of the formula $C_{19}H_{28}O_2$ by reducing the keto group to the secondary alcohol group.

In order to convert the keto group into the secondary alcohol group hitherto either hydrogen in statu nascendi or molecular hydrogen activated by catalysts has been used. As catalysts in these cases the usual platinum or nickel catalysts and the like have been employed. These known reduction methods, however, show a number of disadvantages.

By working for example with aluminum amalgam as reducing agent, in some circumstances, large and, according to the degree of purity of the starting material employed, different quantities thereof are necessary since a part of the hydrogen evolved escapes unused. In this case it is therefore necessary to establish the most favorable conditions for each starting material by particular preliminary experiments. This disadvantage applies in general to all methods in which nascent hydrogen is employed.

When using molecular hydrogen in the presence of catalysts, such as platinum or nickel, there is the danger that carbon to carbon double bonds present in the molecule of the ketone to be reduced are simultaneously hydrogenated. If the simultaneous hydrogenation of the carbon to carbon double bonds is to be avoided care must be taken by observing special reduction conditions so as to cause only the keto group to react with the activated hydrogen.

In general the expert knows how to establish by preliminary experiments the suitable reduction conditions for the transfrmation of a keto group into a secondary alcohol group when using the reduction methods referred to above. Now, however, a new and advantageous reduction process has been found that can be carried out very easily and without taking special precautions; by this method the danger of simultaneously hydrogenating carbon to carbon double bonds present in the compound to be reduced is almost completely eliminated; besides, the new method has the further advantage that the yields of the desired reduction products are very good.

According to the present invention the new reduction method consists in carrying out the reduction by means of hydrogen activated by using so-called alloy-skeleton catalysts. Such catalysts are described for example in the Berichte der Deutschen Chemischen Gasellschaft vol. 67, page 255 (1934), and also in the Journ. of the Am. Chem. Soc., vol. 54, page 4116 (1932). In particular the catalyst given in the latter literature reference, the so-called Raney catalyst, has proved to be very useful.

Preferably, the alloy-skeleton catalysts are prepared by alloying one or more metals that are capable of being decomposed by water or aqueous alkaline solutions with one or more metals that are not decomposed by water or aqueous alkaline solutions and dissolving therefrom that component that is soluble in water or aqueous alkaline solution. Alloys of nickel with aluminum, or nickel with silicon, or cobalt with aluminum or silicon, or nickel and cobalt with silicon have proved especially suitable. The composition of these catalysts may vary within wide limits. Of special value is a mixture of equal parts of the components. Of course, other alloy-skeleton catalysts may be employed likewise as can be obtained, for instance, from copper chromate by ignition.

It has proved advantageous to maintain the temperature during the reduction below 50° C.; however, this depends upon the activity of the catalyst employed and the greater or less hydrogenation capacity of the starting material. The reaction is suitably carried out in the presence of solvents; thereby especially those come into question that are not capable of attacking the catalyst, for example, alcohols, alicyclic hydrocarbons, such as cyclohexane, and the like.

The saturated and unsaturated hormone substances containing a keto group that may be used as starting materials for the present reduction method, for instance, the follicle hormone of the formula $C_{18}H_{22}O_2$, the equiline or hippoline of the formula $C_{18}H_{20}O_2$, the equilenine of the formula $C_{18}H_{18}O_2$, the androsterone of the formula $C_{19}H_{30}O_2$, the dehydro androsterone of the formula $C_{18}H_{28}O_2$ or their isomers, for example, the so-called trans-androsterone of the formula $C_{19}H_{30}O_2$, as well as the diketones derived therefrom such as the androstandiones of the formula $C_{19}H_{28}O_2$ and the androstendiones of the formula $C_{19}H_{26}O_2$, may have been obtained in any manner, for instance, by isolation from natural sources or by synthetic methods.

The derivatives of these compounds may be employed likewise, such as, for instance, the esters, ethers or halogen derivatives and the like, that is to say, for instance, derivatives wherein a hydroxyl group is replaced by a group that, on hydrolysis, can be reconverted into a hydroxyl group. In these cases the corresponding derivatives of the reduction products are obtained that possess likewise very valuable properties. These derivatives can also be obtained by subjecting the starting materials during the reduction process to the action of agents capable of replacing a hydroxyl group by an ester, ether or the like group.

The following examples serve to illustrate the invention without, however, limiting the same to them:

Example 1

5 grams of Raney catalyst are previously reduced in 70 ccs. of ethanol at about 50° C. Thereto are added 5 grams of androstenolone and hydrogen is passed in at 20° C. under normal pressure until the absorption of hydrogen comes to a standstill, that is after the absorption of 1 mol of hydrogen. Thereupon the catalyst is filtered off, the solvent evaporated and the residue recrystalized from dilute alcohol. By this means there is produced practically exclusively an androstendiol of M. P. 176–178° C.

Example 2

5 grams of cobalt-nickel skeleton catalyst are previously reduced in 60 ccs. of ethanol at 50° C. After the addition of 5 grams of androstenolone acetate the solution is shaken with hydrogen at room temperature and normal pressure. After the absorption of 1 mol of hydrogen the reduction comes to a standstill. The catalyst is filtered off, the solvent evaporated and the residue crystallized from ether. By this means the monoacetate of the androstendiol of M. P. 144° C. is obtained.

Example 3

3 grams of androsterone benzoate are reduced as described in Example 2. Thereby is produced the androstandiol monobenzoate of M. P. 215–220° C.

Example 4

2 grams of androstenolone benzoate are shaken at room temperature in 70 ccs. of cyclohexane with hydrogen in the presence of 2 grams of Raney catalyst until the absorption of hydrogen amounts to 1 mol. The catalyst is filtered off, the solvent evaporated and the residue recrystallised from dilute ethanol. About 1.5 g. androstendiol monobenzoate are obtained.

Example 5

3 grams of follicle hormone benzoate are reduced as described in Example 1. There is obtained from dilute alcohol the dihydrofollicle hormone monobenzoate of M. P. 190° C.

Example 6

3 grams of androstandione in 30 ccs. of ethanol are shaken with hydrogen in the present of 1 gram of Raney catalyst until no further absorption of hydrogen takes place. After filtration the solvent is evaporated and the residue recrystallised from dilute alcohol. By this means there is obtained essentially the trans-androstandiol of M. P. 161° C.

Example 7

3 grams of androstandione in 30 ccs. of ethanol are treated with hydrogen in the presence of 1 gram of previously reduced Raney catalyst at room temperature until the absorption of hydrogen amounts to 1 mol. Working up is carried out as described in Example 6 and there is obtained on recrystallisation from ether the trans-androsterone of M. P. 170° C.

Example 8

4 grams of an oil as it is obtained as residue in the production of crystallised follicle hormone are dissolved in 50 ccs. of ethanol and added to 3 grams of Raney catalyst previously reduced according to Example 1. The mixture is shaken with hydrogen until the reduction comes to a standstill. Thereupon the catalyst is filtered off and the solvent evaporated. In an almost quantitative yield a product intermingled with crystals remains the activity of which in the oestrus test is two and a half times as high as that of the starting material.

Various other modifications and changes in the processes and reagents may be made by those skilled in the art in accordance with the principles set forth herein and in the claims annexed hereto.

What we claim is:

1. Method of reducing keto-group-containing unsaturated germinal gland hormones containing at least one keto group, to the corresponding unsaturated hydroxy compounds, comprising treating the starting material with hydrogen in the presence of a skeleton catalyst capable of promoting reduction of a keto group, at a temperature below 50° C. and at a pressure which is approximately atmospheric.

2. Method according to claim 1 wherein a Raney alloy-skeleton catalyst is employed.

3. Method according to claim 1 wherein the reduction is conducted in a solvent that does not attack the catalyst.

4. Method according to claim 1 wherein the formed hydroxyl compound is subjected during the reduction process to the action of an agent capable of replacing a hydroxyl group with a group which on hydrolysis is replaceable by a hydroxyl group.

5. Method according to claim 1, wherein the hormone starting compound is nuclearly substituted by a group which can be replaced by a hydroxyl group with the aid of hydrolysis.

6. Method according to claim 1 wherein the starting material is an unsaturated keto compound of the 10,13-dimethyl-cyclopentano-polyhydro-phenanthrene series.

7. Method according to claim 1 wherein the catalyst is a nickel-skeleton catalyst.

8. Method of reducing unsaturated germinal gland hormones, containing at least one keto group, to the corresponding unsaturated hydroxy compounds, comprising treating the starting material with hydrogen at approximately room temperature and pressure in the presence of a skeleton catalyst capable of promoting reduction of a keto group, and stopping the reaction when approximately a molecular equivalent of hydrogen for each keto group has been absorbed.

LOTHAR STRASSBERGER.
ERWIN SCHWENK.